United States Patent
Hosoe et al.

(10) Patent No.: US 9,390,866 B2
(45) Date of Patent: Jul. 12, 2016

(54) THREE-DIMENSIONAL NETWORK ALUMINUM POROUS BODY FOR CURRENT COLLECTOR, AND CURRENT COLLECTOR, ELECTRODE, NONAQUEOUS ELECTROLYTE BATTERY, CAPACITOR AND LITHIUM-ION CAPACITOR, EACH USING ALUMINUM POROUS BODY

(75) Inventors: Akihisa Hosoe, Osaka (JP); Kazuki Okuno, Osaka (JP); Hajime Ota, Osaka (JP); Koutarou Kimura, Osaka (JP); Kengo Goto, Osaka (JP); Hideaki Sakaida, Osaka (JP); Junichi Nishimura, Imizu (JP)

(73) Assignees: SUMITOMO ELECTRIC INDUSTRIES, LTD., Osaka-shi, Osaka (JP); SUMITOMO ELECTRIC TOYAMA CO., LTD., Imizu-shi, Toyama (JP)

( * ) Notice: Subject to any disclaimer, the term of this patent is extended or adjusted under 35 U.S.C. 154(b) by 356 days.

(21) Appl. No.: 13/977,953

(22) PCT Filed: Feb. 14, 2012

(86) PCT No.: PCT/JP2012/053374
§ 371 (c)(1),
(2), (4) Date: Jul. 2, 2013

(87) PCT Pub. No.: WO2012/111657
PCT Pub. Date: Aug. 23, 2012

(65) Prior Publication Data
US 2013/0288124 A1        Oct. 31, 2013

(30) Foreign Application Priority Data

Feb. 18, 2011   (JP) .................................. 2011-032974
Dec. 21, 2011   (JP) .................................. 2011-279364

(51) Int. Cl.
*H01M 4/02*        (2006.01)
*H01M 4/13*        (2010.01)
(Continued)

(52) U.S. Cl.
CPC .............. *H01G 11/70* (2013.01); *H01G 11/28* (2013.01); *H01G 11/68* (2013.01); *H01M 4/661* (2013.01); *H01M 4/74* (2013.01); *H01G 11/06* (2013.01); *Y02E 60/13* (2013.01)

(58) Field of Classification Search
CPC ... H01M 4/02; H01M 2004/025; H01M 4/70; H01M 4/64
USPC ......................................... 429/209, 211, 233
See application file for complete search history.

(56) References Cited

U.S. PATENT DOCUMENTS 7,713,643 B2 *   5/2010   Kume et al. ................... 429/455
7,838,147 B2 *  11/2010   Kawase ................ H01M 4/134
                                                                   429/208

FOREIGN PATENT DOCUMENTS

JP       S54-022534        2/1979
JP       56-86459 A        7/1981
(Continued)

*Primary Examiner* — Patrick Ryan
*Assistant Examiner* — Julian Anthony
(74) *Attorney, Agent, or Firm* — Drinker Biddle & Reath LLP

(57) ABSTRACT

It is an object of the present invention to provide a current collector including an aluminum porous body suitable for an electrode for a nonaqueous electrolyte battery and an electrode for a capacitor electrode, and an electrode using the current collector. In the three-dimensional network aluminum porous body for a current collector of the present invention, when a sheet-shaped three-dimensional aluminum porous body is divided in the width direction into a central region and two end regions with the central region situated therebetween, the weight per unit area of aluminum in the aluminum porous body at the two end regions is larger than the weight per unit area of aluminum in the aluminum porous body at the central region.

8 Claims, 14 Drawing Sheets

(51) Int. Cl.
- *H01M 4/58* (2010.01)
- *H01M 4/64* (2006.01)
- *H01M 4/72* (2006.01)
- *H01G 11/70* (2013.01)
- *H01G 11/28* (2013.01)
- *H01M 4/66* (2006.01)
- *H01M 4/74* (2006.01)
- *H01G 11/68* (2013.01)
- *H01G 11/06* (2013.01)

(56) References Cited

FOREIGN PATENT DOCUMENTS

| | | | |
|---|---|---|---|
| JP | 62-165862 A | 7/1987 | |
| JP | 4-296454 A | 10/1992 | |
| JP | H06-196169 | 7/1994 | |
| JP | 7-153468 A | 6/1995 | |
| JP | 08-170126 A | 7/1996 | |
| JP | 09-199137 A | 7/1997 | |
| JP | 11-350006 A | 12/1999 | |
| JP | 2000-357519 A | 12/2000 | |
| JP | 3202072 B2 | 8/2001 | |
| JP | 3413662 B2 | 6/2003 | |
| JP | 2006-310261 A | 11/2006 | |
| JP | 2009-004242 A | 1/2009 | |
| JP | 2010-033891 A | 2/2010 | |

* cited by examiner

A-A SECTIONAL VIEW

THREE-DIMENSIONAL NETWORK ALUMINUM POROUS BODY FOR CURRENT COLLECTOR, AND CURRENT COLLECTOR, ELECTRODE, NONAQUEOUS ELECTROLYTE BATTERY, CAPACITOR AND LITHIUM-ION CAPACITOR, EACH USING ALUMINUM POROUS BODY

TECHNICAL FIELD

The present invention relates to a current collector and an electrode, each using a three-dimensional network aluminum porous body for a nonaqueous electrolyte battery (lithium battery, etc.), a capacitor with a nonaqueous electrolytic solution (hereinafter, referred to simply as a "capacitor"), a lithium-ion capacitor with a nonaqueous electrolytic solution (hereinafter referred to simply as a "lithium-ion capacitor") and the like.

BACKGROUND ART

Metal porous bodies having a three-dimensional network structure have been used in a wide range of applications, such as various filters, catalyst supports and battery electrodes. For example, Celmet (manufactured by Sumitomo Electric Industries, Ltd., registered trademark) composed of three-dimensional network nickel porous body (hereinafter, referred to as a "nickel porous body") has been used as an electrode material for batteries, such as nickel-metal hydride batteries and nickel-cadmium batteries. Celmet is a metal porous body having continuous pores and characteristically has a higher porosity (90% or more) than other porous bodies such as metallic nonwoven fabrics. Celmet can be obtained by forming a nickel layer on the surface of the skeleton of a porous resin molded body having continuous pores such as urethane foam, then decomposing the resin molded body by heat treatment, and reducing the nickel. The nickel layer is formed by performing a conductive treatment of applying a carbon powder or the like to the surface of the skeleton of the resin molded body and then depositing nickel by electroplating.

On the other hand, as with nickel, aluminum also has excellent characteristics such as a conductive property, corrosion resistance and lightweight, and for applications in batteries, for example, an aluminum foil in which an active material, such as lithium cobalt oxide, is applied onto the surface thereof has been used as a positive electrode of a lithium battery. In order to increase the capacity of a positive electrode, it is considered that a three-dimensional network aluminum porous body (hereinafter, referred to as an "aluminum porous body") in which the surface area of aluminum is increased is used and the inside of the aluminum is also filled with an active material. The reason for this is that this allows the active material to be utilized even in an electrode having a large thickness and improves the active material availability ratio per unit area.

As a method for producing an aluminum porous body, Patent Literature 1 describes a method of subjecting a three-dimensional network plastic substrate having an inner continuous space to an aluminum deposition treatment by an arc ion plating method to form a metallic aluminum layer having a thickness of 2 to 20 μm.

It is said that in accordance with this method, an aluminum porous body having a thickness of 2 to 20 μm is obtained, but since this method is based on a vapor deposition method, it is difficult to produce a large-area porous body, and it is difficult to form a layer which is internally uniform depend on the thickness or porosity of the substrate. Further, this method has problems that a formation rate of the aluminum layer is low and production cost is high since equipment for production is expensive. Moreover, when a thick film is formed, there is a possibility that cracks may be produced in the film or aluminum may exfoliate.

Patent Literature 2 describes a method of obtaining an aluminum porous body, including forming a film made of a metal (such as copper) on the skeleton of a resin foam molded body having a three-dimensional network structure, the metal having an ability to form a eutectic alloy at temperatures equal to or lower than the melting point of aluminum, then applying an aluminum paste to the film, and performing a heat treatment in a non-oxidizing atmosphere at a temperature of 550° C. or higher and 750° C. or lower to remove an organic constituent (resin foam) and sinter an aluminum powder.

However, in accordance with this method, a layer which forms a eutectic alloy of the above-mentioned metal and aluminum is produced and an aluminum layer of high purity cannot be formed.

As other methods, it is considered that a resin molded body having a three-dimensional network structure is subjected to aluminum plating. An electroplating method of aluminum itself is known, but since aluminum has high affinity to oxygen and a lower electric potential than hydrogen, the electroplating in a plating bath containing an aqueous solution system is difficult. Thus, conventionally, aluminum electroplating has been studied in a plating bath containing a nonaqueous solution system. For example, as a technique for plating a metal surface with aluminum for the purpose of antioxidation of the metal surface, Patent Literature 3 discloses an aluminum electroplating method in which a low melting composition, which is a blend melt of an onium halide and an aluminum halide, is used as a plating bath, and aluminum is deposited on a cathode while the water content of the plating bath is maintained at 2 mass % or less.

However, in the aluminum electroplating, plating of only a metal surface is possible, and there is no known method of electroplating on the surface of a resin molded body, in particular electroplating on the surface of a resin molded body having a three-dimensional network structure.

The present inventors have made earnest investigations concerning a method of electroplating the surface of a polyurethane resin molded body having a three-dimensional network structure with aluminum, and have found that it is possible to plate a polyurethane resin molded body, in which at least the surface is made electrically conductive, by plating the resin molded body with aluminum in a molten salt bath. These findings have led to completion of a method for producing an aluminum porous body. In accordance with this production method, an aluminum structure having a polyurethane resin molded body as the core of its skeleton is obtained. For some applications such as various filters and catalyst supports, the aluminum structure may be used as a resin-metal composite as it is, but when the aluminum structure is used as a metal structure without resin because of constraints resulting from the usage environment, an aluminum porous body needs to be formed by removing the resin.

Removal of the resin can be performed by any method, including decomposition (dissolution) with an organic solvent, a molten salt or supercritical water, decomposition by heating or the like.

Here, a method of decomposition by heating at high temperatures or the like is convenient, but it involves oxidation of aluminum. Since aluminum is difficult to reduce after being oxidized once as distinct from nickel, if being used in, for example, an electrode material of a battery or the like, the electrode loses a conductive property due to oxidation, and therefore aluminum cannot be used as the electrode material. Thus, the present inventors have completed a method for producing an aluminum porous body, in which an aluminum structure obtained by forming an aluminum layer on the surface of a resin molded body is heated to temperatures equal to or lower than the melting point of aluminum in a state of being immersed in a molten salt while applying a negative potential to the aluminum layer to remove the resin molded body through thermal decomposition to obtain an aluminum porous body, as a method of removing a resin without causing the oxidation of aluminum.

Incidentally, in order to use the aluminum porous body thus obtained as an electrode, it is necessary to attach a lead wire to the aluminum porous body to form a current collector, fill the aluminum porous body serving as the current collector with an active material, and subject the resulting aluminum porous body to treatments such as compressing and cutting by a process shown in FIG. 1, but a technology for practical use for industrially producing electrodes for nonaqueous electrolyte batteries, and capacitors and lithium-ion capacitors, and the like from an aluminum porous body has not yet been known.

CITATION LIST

Patent Literatures

Patent Literature 1: Japanese Patent No. 3413662
Patent Literature 2: Japanese Unexamined Patent Publication No. 8-170126
Patent Literature 3: Japanese Patent No. 3202072
Patent Literature 4: Japanese Unexamined Patent Publication No. 56-86459

SUMMARY OF INVENTION

Technical Problem

It is an object of the present invention to provide an electrode using a current collector including an aluminum porous body, the electrode having a decreased current distribution in the electrode plane.

Solution to Problem

The constitution of the present invention is as follows.
(1) A three-dimensional network aluminum porous body for a current collector, wherein when a sheet-shaped three-dimensional aluminum porous body is divided in a width direction into a central region and two end regions with the central region situated therebetween, weights per unit area of aluminum in the aluminum porous body at the two end regions are larger than a weight per unit area of aluminum in the aluminum porous body at the central region.
(2) A three-dimensional network aluminum porous body for a current collector, the three-dimensional network aluminum porous body being obtained by cutting in half the three-dimensional network aluminum porous body for a current collector according to (1) at a central part in the width direction, wherein a weight per unit area of aluminum at one part end is larger than a weight per unit area of aluminum at the other end part in the width direction.
(3) A current collector, wherein a tab lead is welded to be bonded to the end part where the weight per unit area of aluminum is smaller in the three-dimensional network aluminum porous body for a current collector according to (2).
(4) The current collector according to (3), which is formed by bonding a tab lead to a compressed part, the compressed part being formed by compressing in the thickness direction the end part where the weight per unit area of aluminum is smaller.
(5) An electrode, which is formed by filling a porous part of the current collector according to (3) or (4) with an active material.
(6) A nonaqueous electrolyte battery, wherein the electrode according to (5) is used.
(7) A capacitor with a nonaqueous electrolytic solution, wherein the electrode according to (5) is used.
(8) A lithium-ion capacitor with a nonaqueous electrolytic solution, wherein the electrode according to (5) is used.

Advantageous Effect of Invention

An electrode using an aluminum porous body for a current collector according to the present invention has a decreased current distribution in the electrode plane, so that cycle characteristics of a battery and the like using the electrode are improved.

DESCRIPTION OF EMBODIMENTS

First, a method for producing an aluminum porous body according to the present invention will be described. Hereinafter, the production method will be described with reference to the drawings if necessary, taking an example in which an aluminum plating method is applied as a method of forming an aluminum film on the surface of a polyurethane resin molded body for a representative example. Throughout the reference figures hereinafter, the parts assigned the same number are the same parts or the corresponding parts. The present invention is not limited thereto but is defined by the claims, and all modifications which fall within the scope of the claims and the equivalents thereof are intended to be embraced by the claims.

(Step of Producing Aluminum Structure)

Figure 7:
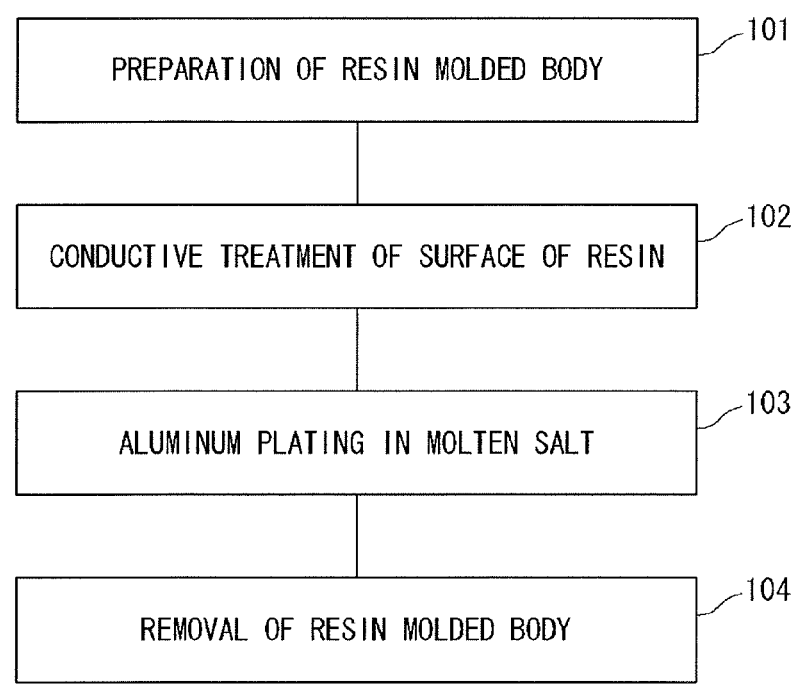
FIG. 7 is a flow chart showing a step of producing an aluminum porous body.
Figure 8:
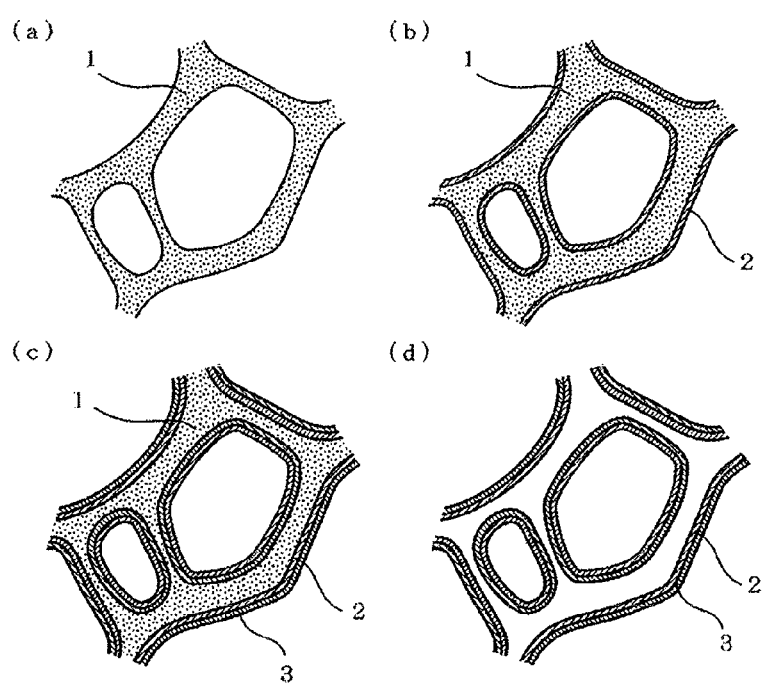
FIG. 8 is a schematic sectional view illustrating a step of producing an aluminum porous body.

FIG. 7 is a flow chart showing a step of producing an aluminum structure. FIG. 8 shows a schematic view of the formation of an aluminum plating film using a resin molded body as a core material corresponding to the flow chart. The overall flow of the production step will be described with reference to both figures. First, preparation 101 of a resin molded body serving as a base material is performed. (a) of FIG. 8 is an enlarged schematic view of the surface of a resin molded body having continuous pores as an example of a resin molded body serving as a base material. Pores are formed in the skeleton of a resin molded body 1. Next, a conductive treatment 102 of the surface of the resin molded body is performed. As illustrated in (b) of FIG. 8 through this step, a thin conductive layer 2 made of an electric conductor is formed on the surface of the resin molded body 1.

Subsequently, aluminum plating 103 in a molten salt is performed to form an aluminum-plated layer 3 on the surface of the conductive layer of the resin molded body ((c) of FIG. 8). Thus, an aluminum structure is obtained in which the aluminum-plated layer 3 is formed on the surface of the resin molded body serving as a base material. Removal 104 of the resin molded body serving as a base material is performed. The resin molded body 1 can be removed by decomposition or the like to obtain an aluminum structure (porous body) containing only a remaining metal layer ((d) of FIG. 8). Hereinafter, each of these steps will be described in turn.

(Preparation of Resin Molded Body)

A resin molded body having a three-dimensional network structure and continuous pores is prepared. A material of the resin molded body may be any resin. As the material, a resin foam molded body made of polyurethane, melamine, polypropylene or polyethylene can be shown as an example. Though the resin foam molded body has been exemplified, a resin molded body having any shape may be selected as long as the resin molded body has continuous pores. For example, a resin molded body having a shape like a nonwoven fabric formed by tangling fibrous resin can be used in place of the resin foam molded body. The resin foam molded body preferably has a porosity of 80% to 98% and a pore diameter of 50 μm to 500 μm. Urethane foams and melamine foams have a high porosity, continuity of pores, and excellent thermal decomposition properties, and therefore they can be preferably used as the resin foam molded body.

Urethane foams are preferred in points of uniformity of pores, easiness of availability and the like, and preferred in that a porous resin molded body with a small pore diameter can be available form urethane foams.

Figure 9:
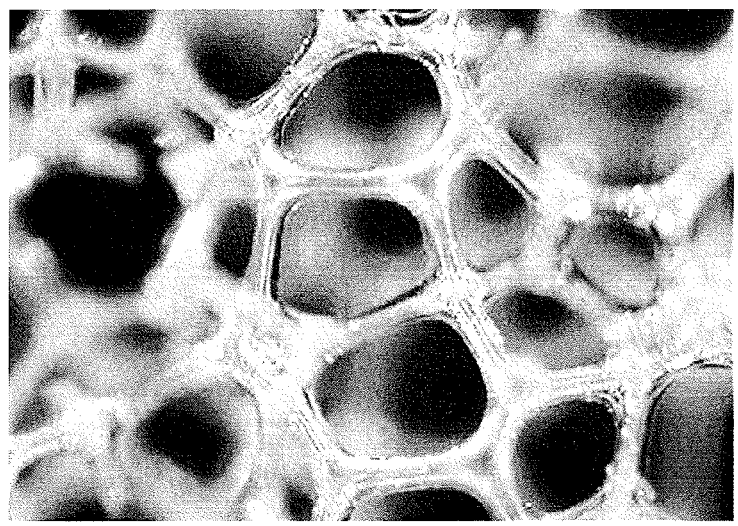
FIG. 9 is an enlarged photograph of the surface showing the structure of a polyurethane resin molded body.

A resin molded body often contains residue materials such as a foaming agent and an unreacted monomer in the production of the foam, and is therefore preferably subjected to a washing treatment for the sake of the subsequent steps. As an example of the resin molded body, a urethane foam subjected to a washing treatment as a preliminary treatment is shown in FIG. 9. In the resin molded body, a three-dimensional network is configured as a skeleton, and therefore continuous pores are configured as a whole. The skeleton of the urethane foam has an almost triangular shape in a cross section perpendicular to its extending direction. Herein, the porosity is defined by the following equation:

Porosity=(1−(mass of porous material [g]/(volume of porous material [cm$^3$]×material density)))× 100[%]

Further, the pore diameter is determined by magnifying the surface of the resin molded body in a photomicrograph or the like, counting the number of pores per inch (25.4 mm) as the number of cells, and calculating an average pore diameter by the following equation: average pore diameter=25.4 mm/the number of cells.

(Conductive Treatment of Surface of Resin Molded Body)

In order to perform electroplating, the surface of the resin foam is previously subjected to a conductive treatment. A method of the conductive treatment is not particularly limited as long as it is treatment by which a layer having a conductive property can be disposed on the surface of the resin molded body, and any method, including electroless plating of a conductive metal such as nickel, deposition and sputtering of aluminum or the like, and application of a conductive coating material containing conductive particles such as carbon, may be selected.

Examples of the conductive treatment may include a method of performing a conductive treatment by a sputtering treatment of aluminum, and a method of subjecting the surface of the resin foam to a conductive treatment using carbon as conductive particles.

(Formation of Aluminum Layer: Molten Salt Plating)

Next, an aluminum-plated layer is formed on the surface of the resin molded body by electroplating in a molten salt. By plating aluminum in the molten salt bath, a thick aluminum layer can be uniformly formed particularly on the surface of a complicated skeleton structure like the resin molded body having a three-dimensional network structure. A direct current is applied between a cathode of the resin molded body having a surface subjected to the conductive treatment and an anode of aluminum with a purity of 99.0% in the molten salt. As the molten salt, an organic molten salt which is a eutectic salt of an organic halide and an aluminum halide or an inorganic molten salt which is a eutectic salt of an alkali metal halide and an aluminum halide may be used. Use of an organic molten salt bath which melts at relatively low temperatures is preferred because it allows plating without the decomposition of the resin molded body serving as a base material. As the organic halide, an imidazolium salt, a pyridinium salt or the like may be used, and specifically, 1-ethyl-3-methylimidazolium chloride (EMIC) and butylpyridinium chloride (BPC) are preferred. Since contamination of the molten salt with water content or oxygen causes degradation of the molten salt, plating is preferably performed in an atmosphere of an inert gas such as nitrogen or argon, and in a sealed environment.

The molten salt bath is preferably a molten salt bath containing nitrogen, and particularly an imidazolium salt bath is preferably used. In the case where a salt which melts at high temperatures is used as the molten salt, the dissolution or decomposition of the resin in the molten salt is faster than the growth of a plated layer, and therefore a plated layer cannot be formed on the surface of the resin molded body. The imidazolium salt bath can be used without having any affect on the resin even at relatively low temperatures. As the imidazolium salt, a salt which contains an imidazolium cation having alkyl groups at 1,3-position is preferably used, and particularly an aluminum chloride+1-ethyl-3-methylimidazolium chloride ($AlCl_3$ +EMIC)-based molten salt is most preferably used because of its high stability and resistance to decomposition. The imidazolium salt bath allows plating of urethane resin foams and melamine resin foams, and the temperatures of the molten salt bath range from 10° C. to 65° C., and preferably 25° C. to 65° C. With a decrease in temperatures, the current density range where plating is possible is narrowed, and plating of the entire surface of a resin molded body becomes difficult. The failure that a shape of a base resin is impaired tends to occur at high temperatures higher than 65° C.

With respect to molten salt aluminum plating on a metal surface, it is reported that an additive, such as xylene, benzene, toluene or 1,10-phenanthroline, is added to $AlCl_3$-EMIC for the purpose of improving the smoothness of the plated surface. The present inventors have found that particularly in the case of performing aluminum plating on a resin molded body having a three-dimensional network structure, the addition of 1,10-phenanthroline has characteristic effects on the formation of an aluminum porous body. That is, it provides a first characteristic that the smoothness of a plated-film is improved, so that an aluminum skeleton forming the porous body is hardly broken, and a second characteristic that uniform plating can be achieved with a small difference in plating thickness between the surface and the interior of the porous body.

In the case of pressing the completed aluminum porous body or the like, the above-mentioned two characteristics of the hard-to-break skeleton and the uniform plating thickness in the interior and exterior can provide a porous body which has a hard-to-break skeleton as a whole and is uniformly pressed. When the aluminum porous body is used as an electrode material for batteries or the like, an electrode is filled with an electrode active material and is pressed to increase its density. Since the skeleton is easily broken in the step of filling with an active material or pressing, the two characteristics are extremely effective in such an application.

According to the above description, the addition of an organic solvent to the molten salt bath is preferred, and particularly 1,10-phenanthroline is preferably used. The amount of the organic solvent added to the plating bath preferably ranges from 0.2 to 7 g/L. When the amount is 0.2 g/L or less, the resulting plating is poor in smoothness and brittle, and it is difficult to achieve an effect of decreasing a difference in thickness between the surface layer and the interior. When the amount is 7 g/L or more, plating efficiency is decreased, so that it is difficult to achieve a predetermined plating thickness.

Figure 10:
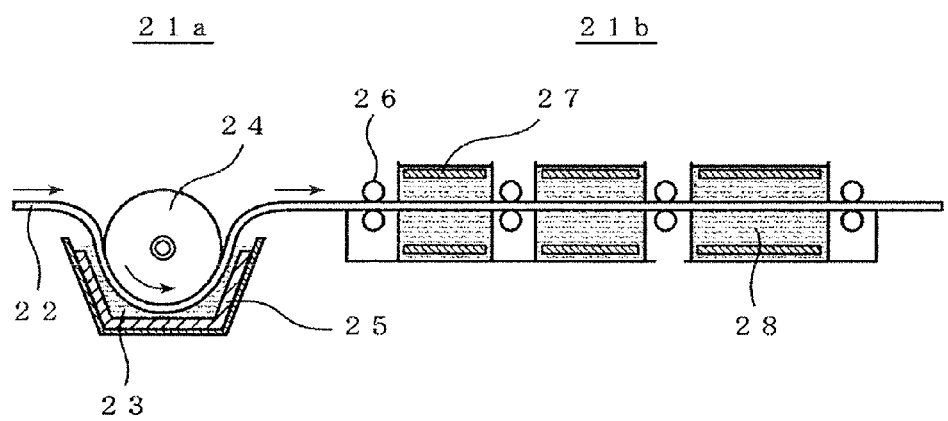
FIG. 10 is a view illustrating an example of a step of continuous aluminum plating utilizing molten salt plating.

FIG. 10 is a view schematically showing the configuration of an apparatus for continuously plating the above-mentioned strip-shaped resin with aluminum. This view shows a configuration in which a strip-shaped resin 22 having a surface subjected to a conductive treatment is transferred from the left to the right in the figure. A first plating bath 21a is configured with a cylindrical electrode 24, an aluminum anode 25 disposed on the inner wall of a container, and a plating bath 23. The strip-shaped resin 22 passes through the plating bath 23 along the cylindrical electrode 24, and thereby a uniform electric current can easily flow through the entire resin molded body, and uniform plating can be achieved. A plating bath 21b is a bath for further performing thick uniform plating and is configured with a plurality of baths so that plating can be performed repeatedly. The strip-shaped resin 22 having a surface subjected to a conductive treatment passes through a plating bath 28 while being transferred successively by electrode rollers 26, which function as feed rollers and power feeding cathodes on the outside of the bath, to thereby perform plating. The plurality of baths include anodes 27 made of aluminum facing both faces of the resin molded body with the plating bath 28 interposed therebetween, which allows more uniform plating on both faces of the resin molded body. A plating liquid is adequately removed from the plated aluminum porous body by nitrogen gas blowing and then the plated aluminum porous body is washed with water to obtain an aluminum porous body.

The feature of the present invention lies in this plating step.

As will be described in detail in the section of "lead welding step" described later, it is necessary that the end part of the aluminum porous body is compressed and a tab lead is bonded to the resulting compressed part as shown in, for example, FIG. 4 when the aluminum porous body is used as a current collector. The tab lead is bonded to the aluminum porous body by a method such as resistance welding or ultrasonic welding.

The aluminum porous body obtained by the above-described plating method has a uniform weight per unit area in the plane. However, a large amount of current passes through sections close to the tab lead-welded part, so that the current is distributed in the electrode plane. The current being distributed means that all the materials forming the electrode do not effectively function, and degradation of sections through which a large amount of current passes is accelerated to shorten the life of the electrode. Thus, it is preferred to prevent the current from being distributed in the electrode plane.

A method for preventing the current from being distributed in the electrode plane includes a method in which the weight per unit area in sections remote from the section to which the tab lead is welded is made large in an aluminum porous body. In this way, the current easily passes through sections remote from the tab lead-welded part, so that the current is not distributed in the electrode plane.

For causing the weight per unit area to be distributed as described above, for example, only sections in which the weight per unit area is desired to be large, in an aluminum porous body subjected to molten salt plating, are immersed in a plating bath and thereby further plated to deposit aluminum on such sections.

Other methods may include a method in which in the conductive treatment step, conductive treatment films at sections of an aluminum porous body where the weight per unit area is desired to be large are formed in a thickness larger than that of conductive treatment films at other sections, and then the aluminum porous body is subjected to molten salt plating.

On the other hand, an inorganic salt bath can also be used as a molten salt to an extent to which a resin is not melted or the like. The inorganic salt bath is a salt of a two-component system, typically $AlCl_3$—XCl (X: alkali metal), or a multi-component system. Such an inorganic salt bath usually has a higher melting temperature than that in an organic salt bath like an imidazolium salt bath, but it has less environmental constraints such as water content and oxygen and can be put to practical use at low cost as a whole. When the resin is melamine resin foam, an inorganic salt bath at 60° C. to 150° C. is employed because the resin can be used at higher temperatures as compared with urethane resin foam.

An aluminum structure having a resin molded body as the core of its skeleton is obtained through the above-mentioned steps. For some applications such as various filters and catalyst supports, the aluminum structure may be used as a resin-metal composite as it is, but when the aluminum structure is used as a metal structure without resin because of constraints resulting from the usage environment, the resin is removed. In the present invention, in order to avoid causing the oxidation of aluminum, the resin is removed through decomposition in a molten salt described below.

(Removal of Resin: Treatment by Molten Salt)

The decomposition in a molten salt is performed in the following manner. A resin molded body having an aluminum-plated layer formed on the surface thereof is immersed in a molten salt, and is heated while applying a negative potential (potential lower than a standard electrode potential of aluminum) to the aluminum layer to remove the resin molded body. When the negative potential is applied to the aluminum layer with the resin molded body immersed in the molten salt, the resin molded body can be decomposed without oxidization of aluminum. The heating temperature can be appropriately selected in accordance with the type of the resin foam molded body. When the resin molded body is urethane, the temperature of the molten salt bath needs to be 380° C. or higher since decomposition of urethane occurs at about 380° C., but the treatment needs to be performed at temperatures equal to or lower than the melting point (660° C.) of aluminum in order to avoid melting aluminum. A preferred temperature range is 500° C. or higher and 600° C. or lower. A negative potential to be applied is on the minus side of the reduction potential of aluminum and on the plus side of the reduction potential of the cation in the molten salt. In this manner, an aluminum porous body which has continuous pores, and has a thin oxide layer on the surface and a low oxygen amount can be obtained.

The molten salt used in the decomposition of the resin may be a halide salt of an alkali metal or alkaline earth metal such that the aluminum electrode potential is lower. Specifically, the molten salt preferably contains one or more salts selected from the group consisting of lithium chloride (LiCl), potassium chloride (KCl), and sodium chloride (NaCl). In this manner, an aluminum porous body which has continuous pores, and has a thin oxide layer on the surface and a low oxygen amount can be obtained.

Next, a process for producing an electrode from the aluminum porous body thus obtained will be described.

Figure 1:
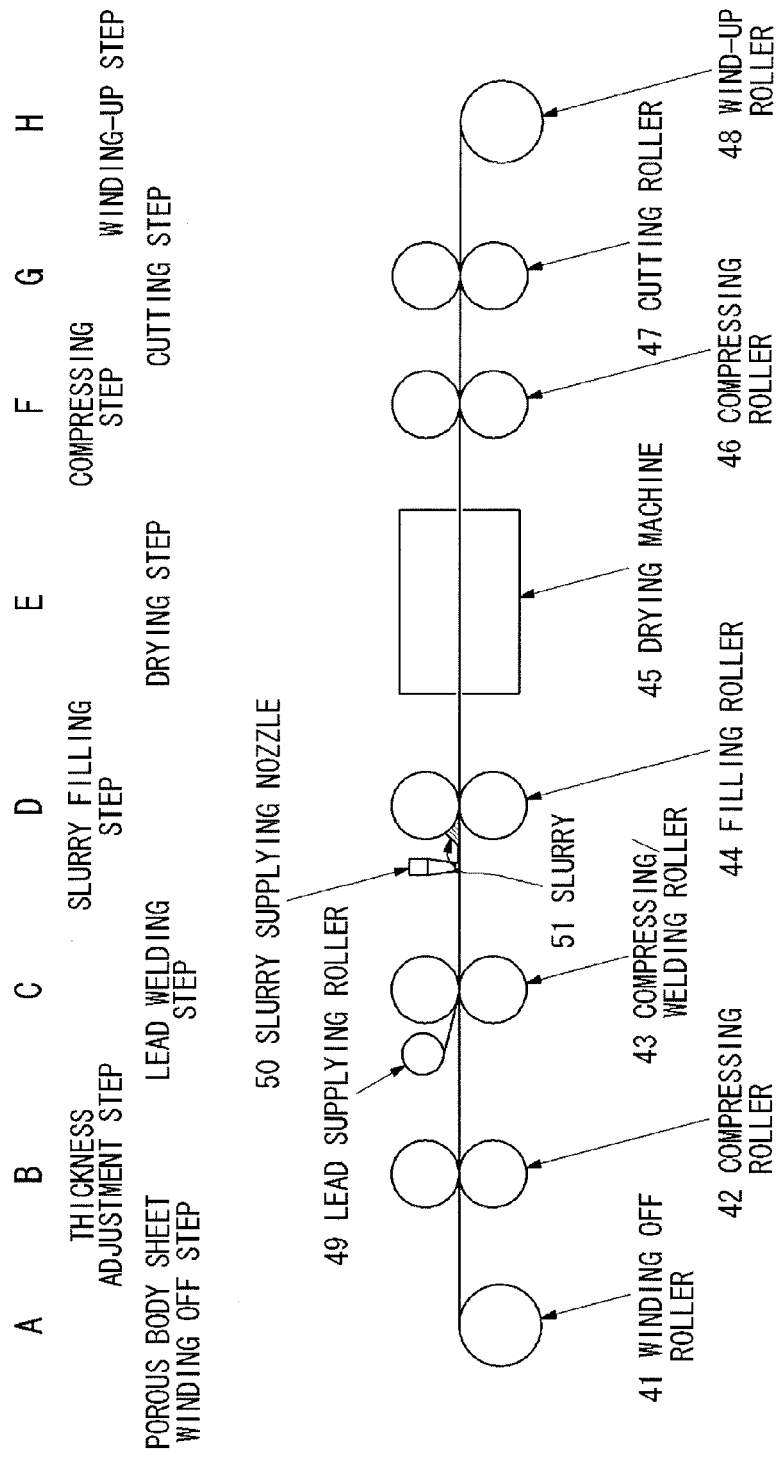
FIG. 1 is a view showing a process for producing an electrode material from an aluminum porous body.

FIG. 1 is a view illustrating an example of a process for continuously producing an electrode from an aluminum porous body. The process includes a porous body sheet winding off step A of winding off a porous body sheet from a winding off roller 41, a thickness adjustment step B using a compressing roller 42, a lead welding step C using a compressing/welding roller 43 and a lead supplying roller 49, a slurry filling step D using a filling roller 44, a slurry supply nozzle 50 and a slurry 51, a drying step E using a drying machine 45, a compressing step F using a compressing roller 46, a cutting step G using a cutting roller 47, and a winding-up step H using a wind-up roller 48. Hereinafter, these steps will be described specifically.

(Thickness Adjustment Step)

An aluminum porous body sheet is wound off from a raw sheet roll around which the sheet of an aluminum porous body has been wound and is adjusted so as to have an optimum thickness and a flat surface by a roller press in the thickness adjustment step. The final thickness of the aluminum porous body is appropriately determined in accordance with an application of an electrode, but this thickness adjustment step is a precompressing step before a compressing step for achieving the final thickness and compresses the aluminum porous body to a level of thickness at which treatment in the following step is easily performed. A flat-plate press or a roller press is used as a pressing machine. The flat-plate press is preferable for suppressing elongation of a current collector, but is not suitable for mass production, and therefore a roller press capable of continuous treatment is preferably used.

(Lead Welding Step)

The lead welding step includes a step of compressing the end part of the aluminum porous body and a step of welding a tab lead to be bonded to the compressed end part.

Hereinafter, the aforementioned steps will be described.

—Compression of End Part of Aluminum Porous Body—

When the aluminum porous body is used as an electrode current collector of a secondary battery or the like, a tab lead for external extraction needs to be welded to the aluminum porous body. In the case of an electrode using the aluminum porous body, since a robust metal part is not present in the aluminum porous body, it is not possible to weld a lead piece directly to the aluminum porous body. Therefore, an end part of the aluminum porous body is processed into the form of a foil by compressing to impart mechanical strength thereto, and a tab lead is welded to the part.

An example of a method of processing the end part of the aluminum porous body will be described.

Figure 2:
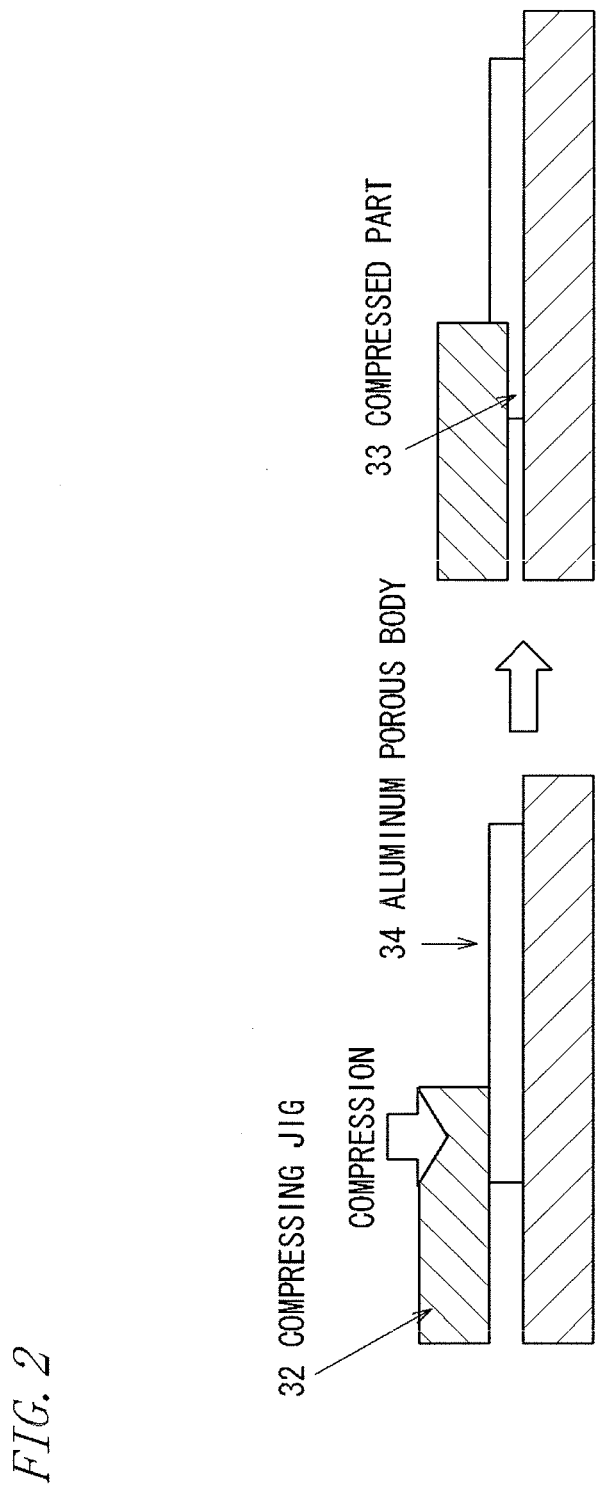
FIG. 2 is a view showing a step of compressing an end part of an aluminum porous body to form a compressed part.

FIG. 2 is a view schematically showing the compressing step.

A rotating roller can be used as a compressing jig.

When the compressed part has a thickness of 0.05 mm or more and 0.2 mm or less (for example, about 0.1 mm), predetermined mechanical strength can be achieved.

Figure 3:
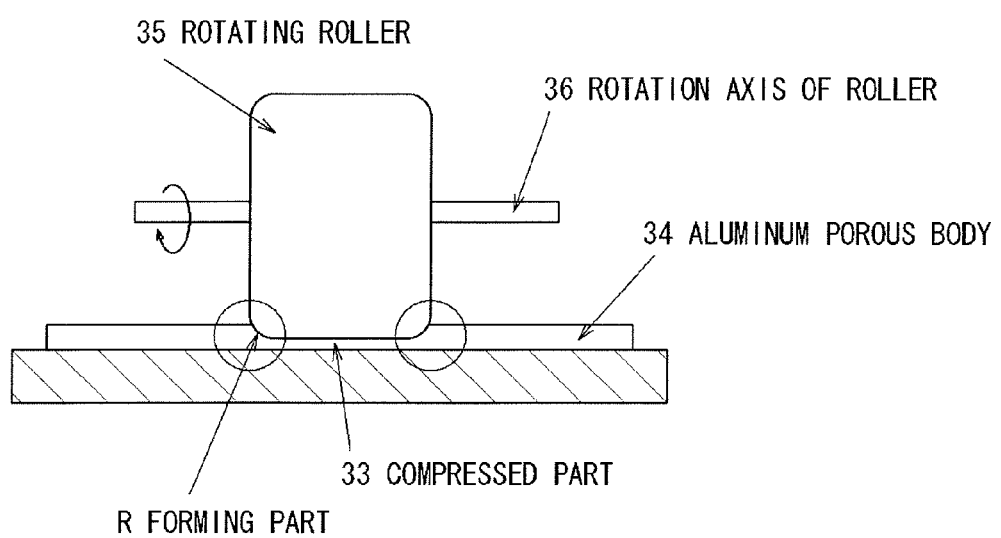
FIG. 3 is a view showing a step of compressing a central part of an aluminum porous body to form a compressed part.

In FIG. 3, the central part of an aluminum porous body 34 having a width of two aluminum porous bodies is compressed by a rotating roller 35 as a compressing jig to form a compressed part (lead part) 33. After compression, the compressed part 33 is cut along the center line of the central part to obtain two sheets of electrode current collectors having a compressed part at the end of the current collector.

Further, a plurality of current collectors can be obtained by forming a plurality of strip-shaped compressed end parts at the central part of the aluminum porous body by using a plurality of rotating rollers, and cutting along the respective center lines of these strip-shaped compressed parts.

—Bonding of Tab Lead to Compressed End Part—

A tab lead is bonded to the compressed end part of the current collector thus obtained. It is preferred that a metal foil is used as a tab lead in order to reduce electric resistance of an electrode and the metal foil is bonded to the surface of at least one side of peripheries of the electrode. Further, in order to reduce electric resistance, welding is preferably employed as a bonding method.

Figure 4:
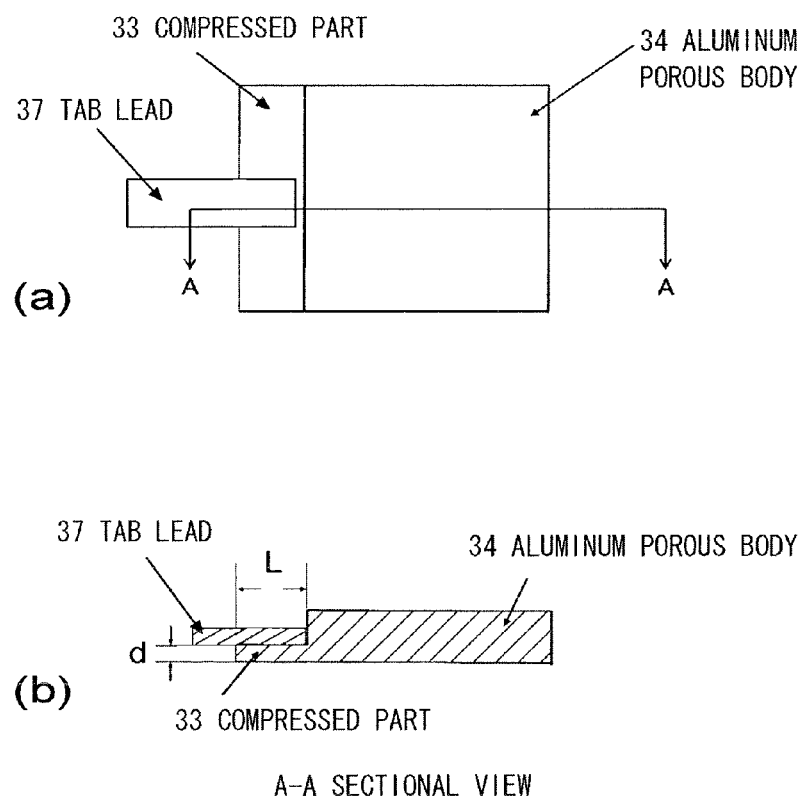
FIG. 4 is a view showing a state in which a tab lead is bonded to a compressed part of an end part of an aluminum porous body.

Schematic views of the obtained current collector are shown in (a) and (b) of FIG. 4. A tab lead 37 is welded to the compressed part 33 of the aluminum porous body 34. (b) of FIG. 4 is an A-A sectional view of (a) of FIG. 4.

Figure 5:
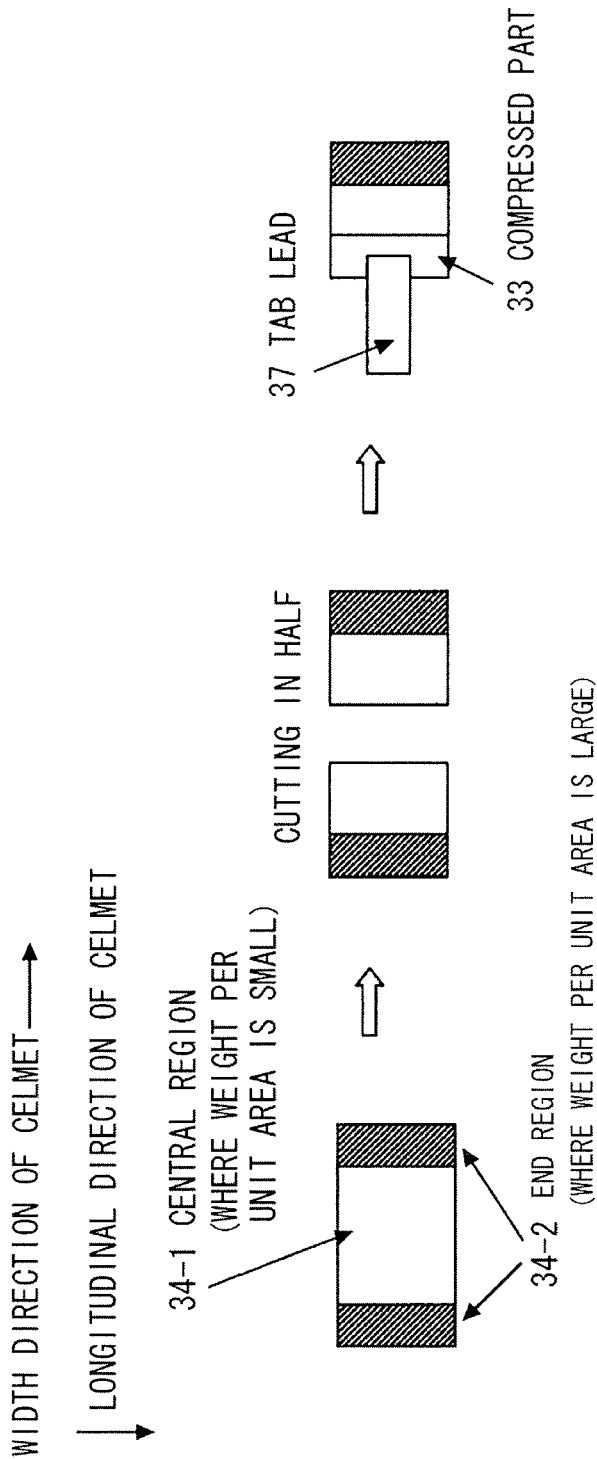
FIG. 5 is a view illustrating a process of producing a current collector of the present invention.

FIG. 5 is a view showing a process of producing the current collector of the present invention, and the shaded part shows a part where the weight per unit area of aluminum is large.

Figure 6:
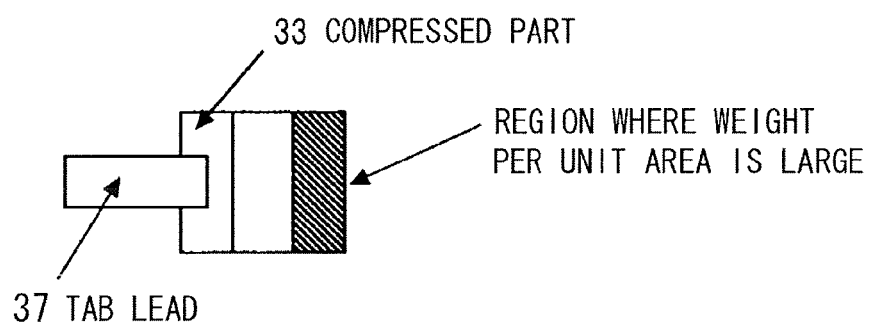
FIG. 6 is a view showing the configuration of a current collector of the present invention.

Plating is performed so that when a sheet-shaped three-dimensional aluminum porous body is divided in the width direction into a central region and two end regions with the central region situated therebetween, the weight per unit area of aluminum in the aluminum porous body at the two end regions is larger than the weight per unit area of aluminum in the aluminum porous body at the central region (see the left in FIG. 5). Then, the aluminum porous body is cut in half at the central part in the width direction (see the center in FIG. 5). A current collector is obtained by bonding a tab lead to the resulting aluminum porous body on a side where the weight per unit area of aluminum is small (see the right in FIG. 5). Further, the current collector of the present invention is shown in FIG. 6.

A width L of the compressed part for welding a metal foil as shown in FIG. 4 is preferably 10 mm or less since a too wide width for welding causes wasted space to increase in a battery and a capacity density of the battery is decreased. When the width for welding is too narrow, welding becomes difficult and the effect of collecting a current is deteriorated, and therefore the width is preferably 2 mm or more.

As a method of welding, a method of resistance welding or ultrasonic welding can be used, but ultrasonic welding is preferred because of its larger adhesive area.

—Metal Foil—

A material of the metal foil is preferably aluminum in consideration of electric resistance and tolerance for an electrolytic solution. Further, since impurities in the metal foil causes the elution or reaction of the impurities in a battery, a capacitor or a lithium-ion capacitor, an aluminum foil having a purity of 99.99% or more is preferably used. The thickness of the welded part is preferably smaller than that of the electrode itself.

The aluminum foil is preferably made to have a thickness of 20 to 500 μm.

Though the compressing step of the end part and the bonding step of the tab lead have been described as separate steps in the above description, the compressing step and the bonding step may be performed simultaneously. In this case, a roller, in which a roller part to be brought into contact, as a compressing roller, with an end part for bonding a tab lead of the aluminum porous body sheet can perform resistance welding, is used, and the aluminum porous body sheet and the metal foil can be simultaneously supplied to the roller to perform compressing of the end part and metal foil welding to the compressed part simultaneously.

(Step of Filling Active Material)

An electrode is obtained by filling the current collector with an active material. The type of the active material is appropriately selected in accordance with the purpose of use of the electrode.

For filling the active material, for example, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material is filled, a conduction aid or a binder is added as required, and an organic solvent is mixed therewith to prepare a slurry, and the prepared slurry is filled into the aluminum porous body by using the above-mentioned filling method.

FIG. 1 shows a method of filling a porous body with a slurry by a roll coating method. As shown in the figure, the slurry is supplied onto a porous body sheet and this sheet is passed between a pair of rotating rollers opposed to each other at a predetermined interval. The slurry is pressed and filled into the porous body when passing between the rotating rollers.

(Drying Step)

The porous body filled with the active material is transferred to a drying machine and heated to evaporate/remove the organic solvent and thus an electrode material having the active material fixed in the porous body is obtained.

(Compressing Step)

The dried electrode material is compressed to a final thickness in the compressing step. A flat-plate press or a roller press is used as a pressing machine. The flat-plate press is preferable for suppressing elongation of a current collector, but is not suitable for mass production, and therefore a roller press capable of continuous treatment is preferably used.

A case of compression by a roller press is shown in the compressing step F of FIG. 1.

(Cutting Step)

In order to improve the ability of mass production of the electrode material, it is preferred that the width of a sheet of the aluminum porous body is set to the width of a plurality of final products and the sheet is cut along its traveling direction with a plurality of blades to form a plurality of long sheets of electrode materials. This cutting step is a step of dividing a long length of electrode material into a plurality of long lengths of electrode materials.

(Winding-Up Step)

This step is a step of winding up the plurality of long sheets of electrode materials obtained in the above-mentioned cutting step around a wind-up roller.

Next, applications of the electrode material obtained in the above-mentioned step will be described.

Examples of main applications of the electrode material in which the aluminum porous body is used as a current collector include electrodes for nonaqueous electrolyte batteries such as a lithium battery and a molten salt battery, an electrode for a capacitor, and an electrode for a lithium-ion capacitor.

Hereinafter, these applications will be described.

(Lithium Battery)

Next, an electrode material for batteries using an aluminum porous body and a battery will be described below. For example, when an aluminum porous body is used in a positive electrode of a lithium battery (including a lithium-ion secondary battery, etc.), lithium cobalt oxide ($LiCoO_2$), lithium manganese oxide ($LiMn_2O_4$), lithium nickel oxide ($LiNiO_2$) or the like is used as an active material. The active material is used in combination with a conduction aid and a binder.

In a conventional positive electrode material for lithium batteries, an electrode formed by applying an active material onto the surface of an aluminum foil is used. Though a lithium battery has a higher capacity than a nickel-metal hydride battery or a capacitor, a further increase in capacity is required in automobile applications and the like. Therefore, in order to increase a battery capacity per unit area, the application thickness of the active material is increased. Further, in order to effectively utilize the active material, the active material needs to be in electrical contact with the aluminum foil serving as a current collector, and therefore, the active material is mixed with a conduction aid to be used.

In contrast, the aluminum porous body of the present invention has a high porosity and a large surface area per unit area. Thus, a contact area between the current collector and the active material is increased, and therefore, the active material can be effectively utilized, the battery capacity can be improved, and the amount of the conduction aid to be mixed can be decreased. In a lithium battery, the above-mentioned positive electrode materials are used for a positive electrode, and for a negative electrode, a foil, punched metal or porous body of copper or nickel is used as a current collector and a negative electrode active material such as graphite, lithium titanium oxide ($Li_4Ti_5O_{12}$), an alloy of Sn, Si, etc., lithium metal or the like is used. The negative electrode active material is also used in combination with a conduction aid and a binder.

Such a lithium battery can have an increased capacity even with a small electrode area and accordingly have a higher energy density than a conventional lithium battery using an aluminum foil. The effects of the present invention in a secondary battery has been mainly described above, but the effects of the present invention in a primary battery is the same as that in the secondary battery, and a contact area is increased when the aluminum porous body is filled with the active material and a capacity of the primary battery can be improved.

(Configuration of Lithium Battery)

An electrolyte used in a lithium battery includes a non-aqueous electrolytic solution and a solid electrolyte.

Figure 11:
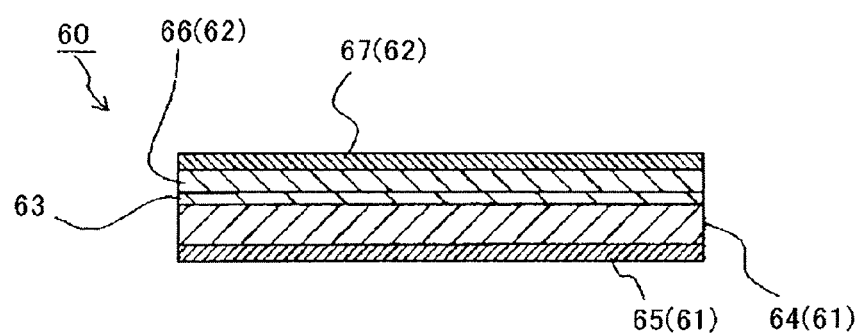
FIG. 11 is a schematic view showing an example of a structure in which an aluminum porous body is applied to a lithium battery.

FIG. 11 is a vertical sectional view of a solid-state lithium battery using a solid electrolyte. A solid-state lithium battery 60 includes a positive electrode 61, a negative electrode 62, and a solid electrolyte layer (SE layer) 63 arranged between both electrodes. The positive electrode 61 includes a positive electrode layer (positive electrode body) 64 and a current collector 65 of positive electrode, and the negative electrode 62 includes a negative electrode layer 66 and a current collector 67 of negative electrode.

As the electrolyte, a nonaqueous electrolytic solution described later is used besides the solid electrolyte. In this case, a separator (porous polymer film, nonwoven fabric, paper or the like) is arranged between both electrodes, and both electrodes and separator are impregnated with the nonaqueous electrolytic solution.

(Active Material Filled into Aluminum Porous Body)

When an aluminum porous body is used in a positive electrode of a lithium battery, a material that can extract/insert lithium can be used as an active material, and an aluminum porous body filled with such a material can provide an electrode suitable for a lithium secondary battery. As the material of the positive electrode active material, for example, lithium cobalt oxide ($LiCoO_2$), lithium nickel oxide ($LiNiO_2$), lithium cobalt nickel oxide ($LiCo_{0.3}Ni_{0.7}O_2$), lithium manganese oxide ($LiMn_2O_4$), lithium titanium oxide ($Li_4Ti_5O_{12}$), lithium manganese oxide compound ($LiMyMn_{2-y}O_4$); M=Cr, Co, Ni) or lithium acid is used. The active material is used in combination with a conduction aid and a binder. Examples thereof include transition metal oxides such as conventional lithium iron phosphate and olivine compounds which are compounds ($LiFePO_4$, $LiFe_{0.5}Mn_{0.5}PO_4$) of the lithium iron phosphate. Further, the transition metal elements contained in these materials may be partially substituted with another transition metal element.

Moreover, examples of other positive electrode active material include lithium metals in which the skeleton is a sulfide-based chalcogenide such as $TiS_2$, $V_2S_3$, FeS, $FeS_2$ or LiMSx (M is a transition metal element such as Mo, Ti, Cu, Ni, or Fe, or Sb, Sn or Pb), and a metal oxide such as $TiO_2$, $Cr_3O_8$, $V_2O_5$ or $MnO_2$. Herein, the above-mentioned lithium titanium oxide ($Li_4Ti_5O_{12}$) can also be used as a negative electrode active material.

(Electrolytic Solution Used in Lithium Battery)

A nonaqueous electrolytic solution includes a polar aprotic organic solvent, and specifically, ethylene carbonate, diethyl carbonate, dimethyl carbonate, propylene carbonate, γ-butyrolactone, sulfolane and the like are used. As a supporting electrolyte, lithium tetrafluoroborate, lithium hexafluorophosphate, an imide salt or the like is used. The concentration of the supporting electrolyte serving as an electrolyte is preferably higher, but a supporting electrolyte having a concentration of about 1 mol/L is generally used since there is a limit of dissolution.

(Solid Electrolyte Filled into Aluminum Porous Body)

The aluminum porous body may be additionally filled with a solid electrolyte besides the active material. The aluminum porous body can be suitable for an electrode of a solid-state lithium battery by filling the aluminum porous body with the active material and the solid electrolyte. However, the ratio of the active material to materials filled into the aluminum porous body is preferably adjusted to 50 mass % or more, and more preferably 70 mass % or more from the viewpoint of ensuring a discharge capacity.

A sulfide-based solid electrolyte having high lithium ion conductivity is preferably used for the solid electrolyte, and examples of the sulfide-based solid electrolyte include sulfide-based solid electrolytes containing lithium, phosphorus and sulfur. The sulfide-based solid electrolyte may further contain an element such as O, Al, B, Si or Ge.

Such a sulfide-based solid electrolyte can be obtained by a publicly known method. Examples of the publicly known method include a method in which lithium sulfide ($Li_2S$) and diphosphorus pentasulfide ($P_2S_5$) are prepared as starting materials, $Li_2S$ and $P_2S_5$ are mixed in proportions of about 50:50 to about 80:20 in terms of mole ratio, and the resulting mixture is fused and quenched (melting and rapid quenching method) and a method of mechanically milling the quenched product (mechanical milling method).

The sulfide-based solid electrolyte obtained by the above-mentioned method is amorphous. The sulfide-based solid electrolyte can also be utilized in this amorphous state, but it may be subjected to a heat treatment to form a crystalline sulfide-based solid electrolyte. It can be expected to improve lithium ion conductivity by this crystallization.

(Filling of Active Material into Aluminum Porous Body)

For filling the active material (active material and solid electrolyte), for example, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material (active material and solid electrolyte) is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect on materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolane, ethylene glycol, and N-methyl-2-pyrrolidone. Further, when water is used as a solvent, a surfactant may be used for enhancing filling performance.

In addition, in a conventional positive electrode material for lithium batteries, an electrode is formed by applying an active material onto the surface of an aluminum foil. In order to increase a battery capacity per unit area, the application thickness of the active material is increased. Further, in order to effectively utilize the active material, the active material needs to be in electrical contact with the aluminum foil, and therefore, the active material is mixed with a conduction aid to be used. In contrast, the aluminum porous body according to the present invention has a high porosity and a large surface area per unit area. Thus, a contact area between the current collector and the active material is increased, and therefore, the active material can be effectively utilized, the battery capacity can be improved, and the amount of the conduction aid to be mixed can be decreased.

(Electrode for Capacitor)

Figure 12:
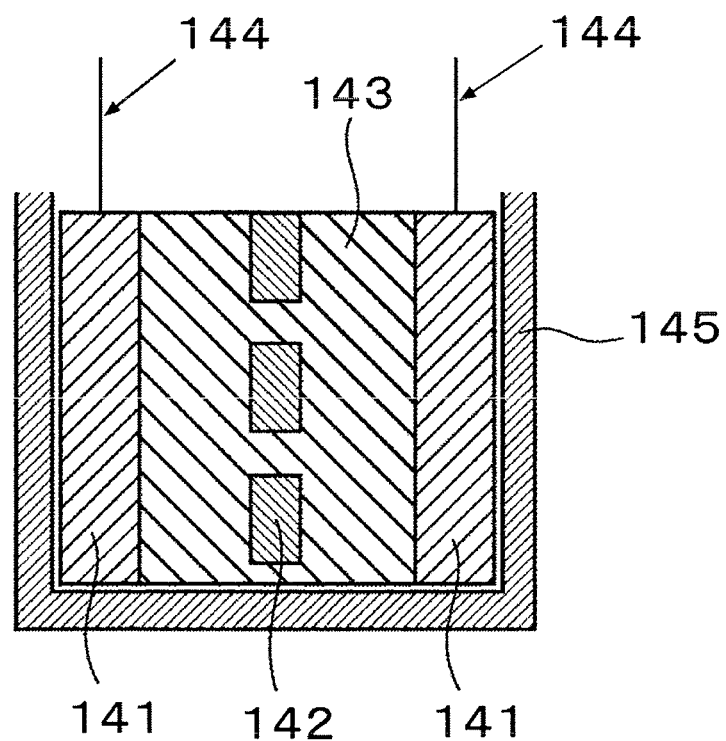
FIG. 12 is a schematic view showing an example of a structure in which an aluminum porous body is applied to a capacitor.

FIG. 12 is a schematic sectional view showing an example of a capacitor produced by using the electrode material for a capacitor. An electrode material formed by supporting an electrode active material on an aluminum porous body is arranged as a polarizable electrode 141 in an organic electrolytic solution 143 partitioned with a separator 142. The polarizable electrode 141 is connected to a lead wire 144, and all these components are housed in a case 145. When the aluminum porous body is used as a current collector, the surface area of the current collector is increased and a contact area between the current collector and activated carbon as an active material is increased, and therefore, a capacitor that can realize a high output and a high capacity can be obtained.

When an electrode for a capacitor is produced, a current collector of the aluminum porous body is filled with activated carbon as an active material. The activated carbon is used in combination with a conduction aid or a binder.

In order to increase the capacity of the capacitor, the amount of the activated carbon as a main component is preferably in a large amount, and the amount of the activated carbon is preferably 90% or more in terms of the composition ratio after drying (after removing a solvent). A conduction aid or a binder is necessary, but the amount thereof are preferably as small as possible because it is a cause of a reduction in capacity, and further the binder is a cause of an increase in internal resistance. Preferably, the amount of the conduction aid is 10 mass % or less, and the amount of the binder is 10 mass % or less.

When the surface area of the activated carbon is larger, the capacity of the capacitor is larger, and therefore, the activated carbon preferably has a specific surface area of 1000 $m^2/g$ or more. As a material of the activated carbon, a plant-derived palm shell, a petroleum-based material or the like may be used. In order to increase the surface area of the activated carbon, the material is preferably activated by use of steam or alkali.

The electrode material predominantly composed of the activated carbon is mixed and stirred to obtain an activated carbon paste. This activated carbon paste is filled into the above-mentioned current collector and dried, and its density is increased by compressing with a roller press or the like as required to obtain an electrode for a capacitor.

(Filling of Activated Carbon into Aluminum Porous Body)

For filling the activated carbon, for example, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the activated carbon is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect on materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolane, ethylene glycol, and N-methyl-2-pyrrolidone. Further, when water is used as a solvent, a surfactant may be used for enhancing filling performance.

(Preparation of Capacitor)

The electrode obtained in the above-mentioned manner is punched out into an appropriate size to prepare two sheets, and these two electrodes are opposed to each other with a separator interposed therebetween. A porous film or nonwoven fabric made of cellulose or a polyolefin resin is preferably used for the separator. Then, the electrodes are housed in a cell case with required spacers, and impregnated with an electrolytic solution. Finally, a lid is put on the case with an insulating gasket interposed between the lid and the case and is sealed, and thus an electric double layer capacitor can be prepared. When a nonaqueous material is used, materials of the electrode and the like are preferably adequately dried for decreasing the water content in the capacitor as much as possible. Preparation of the capacitor is performed in low water content environments, and sealing may be performed in reduced-pressure environments. In addition, the capacitor is not particularly limited as long as the current collector and electrode of the present invention are used, and any capacitor may be used which is prepared by a method other than this method.

Though both an aqueous electrolytic solution and a nonaqueous electrolytic solution can be used as the electrolytic solution, the nonaqueous electrolytic solution is preferably used since its voltage can be set at a higher level than that of the aqueous electrolytic solution. In the aqueous electrolytic solution, potassium hydroxide or the like can be used as an electrolyte. The nonaqueous electrolytic solution includes many ionic liquids in combination of a cation and an anion. As the cation, lower aliphatic quaternary ammonium, lower aliphatic quaternary phosphonium, imidazolium or the like is used, and as the anion, ions of metal chlorides, ions of metal fluorides, and imide compounds such as bis(fluorosulfonyl) imide and the like are known. Further, the nonaqueous electrolytic solution includes a polar aprotic organic solvent, and specific examples thereof include ethylene carbonate, diethyl carbonate, dimethyl carbonate, propylene carbonate, γ-butyrolactone and sulfolane. As a supporting electrolyte in the nonaqueous electrolytic solution, lithium tetrafluoroborate, lithium hexafluorophosphate or the like is used.

(Lithium-Ion Capacitor)

Figure 13:
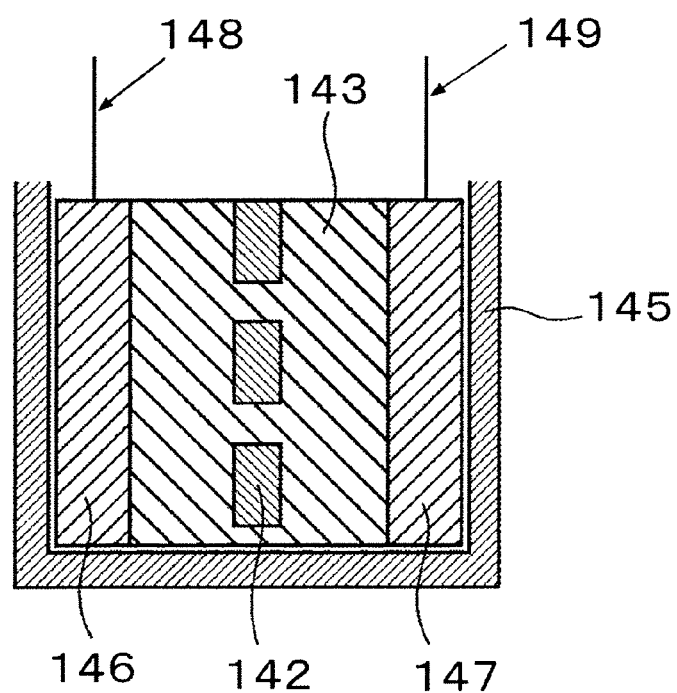
FIG. 13 is a schematic view showing an example of a structure in which an aluminum porous body is applied to a lithium-ion capacitor.

FIG. 13 is a schematic sectional view showing an example of a lithium-ion capacitor using an electrode material for a lithium-ion capacitor. In an organic electrolytic solution 143 partitioned with a separator 142, an electrode material formed by supporting a positive electrode active material on an aluminum porous body is arranged as a positive electrode 146 and an electrode material formed by supporting a negative electrode active material on a current collector is arranged as a negative electrode 147. The positive electrode 146 and the negative electrode 147 are connected to a lead wire 148 and a lead wire 149, respectively, and all these components are housed in a case 145. When the aluminum porous body is used as a current collector, the surface area of the current collector is increased, and therefore, even when activated carbon as an active material is applied onto the aluminum porous body in a thin manner, a lithium-ion capacitor that can realize a high output and a high capacity can be obtained.

(Positive Electrode)

When an electrode for a lithium-ion capacitor is produced, a current collector of the aluminum porous body is filled with activated carbon as an active material. The activated carbon is used in combination with a conduction aid or a binder.

In order to increase the capacity of the lithium-ion capacitor, the amount of the activated carbon as a main component is preferably in a large amount, and the amount of the activated carbon is preferably 90% or more in terms of the composition ratio after drying (after removing a solvent). A conduction aid or a binder is necessary, but the amount thereof are preferably as small as possible because it is a cause of a reduction in capacity, and further the binder is a cause of an increase in internal resistance. Preferably, the amount of the conduction aid is 10 mass % or less, and the amount of the binder is 10 mass % or less.

When the surface area of the activated carbon is larger, the capacity of the lithium-ion capacitor is larger, and therefore, the activated carbon preferably has a specific surface area of 1000 $m^2/g$ or more. As a material of the activated carbon, a plant-derived palm shell, a petroleum-based material or the like may be used. In order to increase the surface area of the activated carbon, the material is preferably activated by use of steam or alkali. As the conduction aid, Ketjen Black, acetylene black, carbon fibers or composite materials thereof may be used. As the binder, polyvinylidene fluoride, polytetrafluoroethylene, polyvinyl alcohol, carboxymethyl cellulose, xanthan gum and the like may be used. A solvent may be appropriately selected from water and an organic solvent depending on the type of the binder. For the organic solvent, N-methyl-2-pyrrolidone is often used. Further, when water is used as the solvent, a surfactant may be used for enhancing filling performance.

The electrode material predominantly composed of the activated carbon is mixed and stirred to obtain an activated carbon paste. This activated carbon paste is filled into the above-mentioned current collector and dried, and its density is increased by compressing with a roller press or the like as required to obtain an electrode for a lithium-ion capacitor.

(Filling of Activated Carbon into Aluminum Porous Body)

For filling the activated carbon, for example, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the activated carbon is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect on materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolane, ethylene glycol, and N-methyl-2-pyrrolidone. Further, when water is used as a solvent, a surfactant may be used for enhancing filling performance.

(Negative Electrode)

A negative electrode is not particularly limited and a conventional negative electrode for lithium batteries can be used, but an electrode, in which an active material is filled into a porous body made of copper or nickel like the foamed nickel described above, is preferable because a conventional electrode, in which a copper foil is used in a current collector, has a small capacity. Further, in order to make operation as a lithium-ion capacitor, the negative electrode is preferably doped with lithium ions in advance. As a doping method, publicly known methods can be employed. Examples thereof include a method in which a lithium metal foil is affixed to the surface of a negative electrode and this is dipped into an electrolytic solution for doping, a method in which an electrode having lithium metal fixed thereto is arranged in a lithium-ion capacitor, and after assembling a cell, an electric current is passed between a negative electrode and the lithium metal electrode to electrically dope the electrode, and a method in which an electrochemical cell is assembled from a negative electrode and lithium metal, and a negative electrode electrically doped with lithium is taken out and used.

In any method, it is preferred that the amount of lithium-doping is large in order to adequately decrease the potential of the negative electrode, but the negative electrode is preferably left without being doped by the capacity of the positive electrode because when the residual capacity of the negative electrode is smaller than the capacity of the positive electrode, the capacity of the lithium-ion capacitor becomes small.

(Electrolytic Solution Used in Lithium-Ion Capacitor)

The same nonaqueous electrolytic solution as that used in a lithium battery is used for an electrolytic solution. A nonaqueous electrolytic solution includes a polar aprotic organic solvent, and specifically, ethylene carbonate, diethyl carbonate, dimethyl carbonate, propylene carbonate, γ-butyrolactone, sulfolane and the like are used. As a supporting electrolyte, lithium tetrafluoroborate, lithium hexafluorophosphate, an imide salt or the like is used.

(Preparation of Lithium-Ion Capacitor)

The electrode obtained in the above-mentioned manner is punched out into an appropriate size, and is opposed to the negative electrode with a separator interposed between the punched out electrode and the negative electrode. The negative electrode may be an electrode doped with lithium ions by the above-mentioned method, and when the method of doping the negative electrode after assembling a cell is employed, an electrode having lithium metal connected thereto may be arranged in the cell. A porous film or nonwoven fabric made of cellulose or a polyolefin resin is preferably used for the separator. Then, the electrodes are housed in a cell case with required spacers, and impregnated with an electrolytic solution. Finally, a lid is put on the case with an insulating gasket interposed between the lid and the case and is sealed, and thus a lithium-ion capacitor can be prepared. Materials of the electrode and the like are preferably adequately dried for decreasing the water content in the lithium-ion capacitor as much as possible. Further, preparation of the lithium-ion capacitor is performed in low water content environments, and sealing may be performed in reduced-pressure environments. In addition, the lithium-ion capacitor is not particularly limited as long as the current collector and electrode of the present invention are used, and any capacitor may be used which is prepared by a method other than this method.

(Electrode for Molten Salt Battery)

The aluminum porous body can also be used as an electrode material for molten salt batteries. When the aluminum porous body is used as a positive electrode material, a metal compound such as sodium chromite ($NaCrO_2$) or titanium disulfide ($TiS_2$) into which a cation of a molten salt serving as an electrolyte can be intercalated is used as an active material. The active material is used in combination with a conduction aid and a binder. As the conduction aid, acetylene black or the like may be used. As the binder, polytetrafluoroethylene (PTFE) or the like may be used. When sodium chromite is used as the active material and acetylene black is used as the conduction aid, the binder is preferably PTFE because PTFE can tightly adhere to sodium chromite and acetylene black.

The aluminum porous body can also be used as a negative electrode material for molten salt batteries. When the aluminum porous body is used as a negative electrode material, sodium alone, an alloy of sodium and another metal, carbon, or the like may be used as an active material. Sodium has a melting point of about 98° C. and a metal becomes softer with an increase in temperatures. Thus, it is preferable to alloy sodium with another metal (Si, Sn, In, etc.). In particular, an alloy of sodium and Sn is preferred because the alloy is easily handled. Sodium or a sodium alloy can be supported on the surface of the aluminum porous body by electroplating, hot dipping or the like. Alternatively, a metal (Si, etc.) to be alloyed with sodium may be deposited on the aluminum porous body by plating or the like, and then converted into a sodium alloy by charging in a molten salt battery.

Figure 14:
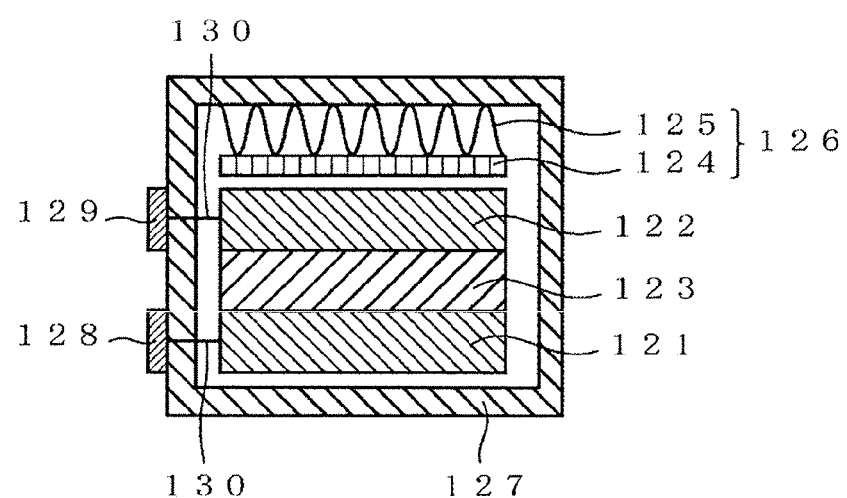
FIG. 14 is a schematic sectional view showing an example of a structure in which an aluminum porous body is applied to a molten salt battery.

FIG. 14 is a schematic sectional view showing an example of a molten salt battery in which the above-mentioned electrode material for batteries is used. The molten salt battery includes a positive electrode 121 in which a positive electrode active material is supported on the surface of an aluminum skeleton part of an aluminum porous body, a negative electrode 122 in which a negative electrode active material is supported on the surface of an aluminum skeleton part of an aluminum porous body, and a separator 123 impregnated with a molten salt serving as an electrolyte, which are housed in a case 127. A pressing member 126 including a presser plate 124 and a spring 125 for pressing the presser plate is arranged between the top surface of the case 127 and the negative electrode. By providing the pressing member, the positive electrode 121, the negative electrode 122 and the separator 123 can be evenly pressed to be brought into contact with one another even when their volumes are changed. A current collector (aluminum porous body) of the positive electrode 121 and a current collector (aluminum porous body) of the negative electrode 122 are connected to a positive electrode terminal 128 and a negative electrode terminal 129, respectively, through a lead wire 130.

The molten salt serving as an electrolyte may be various inorganic salts or organic salts which melt at the operating temperatures. As a cation of the molten salt, one or more cations selected from alkali metals such as lithium (Li), sodium (Na), potassium (K), rubidium (Rb) and cesium (Cs), and alkaline earth metals such as beryllium (Be), magnesium (Mg), calcium (Ca), strontium (Sr) and barium (Ba) may be used.

In order to decrease the melting point of the molten salt, it is preferable to use a mixture of two or more salts. For example, use of potassium bis(fluorosulfonyl)amide <K—N$(SO_2F)_2$; KFSA> and sodium bis(fluorosulfonyl)amide <Na—N$(SO_2F)_2$; NaFSA> in combination can decrease the battery operating temperature to 90° C. or lower.

The molten salt is used in the form of a separator impregnated with the molten salt. The separator prevents the contact between the positive electrode and the negative electrode, and may be a glass nonwoven fabric, a porous resin molded body or the like. A laminate of the positive electrode, the negative electrode, and the separator impregnated with the molten salt is housed in a case for use as a battery.

EXAMPLES

Hereinafter, the present invention will be described in more detail based on Examples, but the present invention is not limited thereto.

Example 1

(Formation of Conductive Layer)

A urethane foam having a porosity of 95%, a number of pores of about 50 pores (cells) per inch, a pore diameter of about 550 μm, and a thickness of 1 mm was prepared as a resin molded body and was cut into a 100 mm×30 mm square. Aluminum was deposited on the surface of the polyurethane foam in a weight per unit area of 10 $g/m^2$ by the sputtering method to form a conductive layer.

(Molten Salt Plating)

The urethane foam having a conductive layer on the surface thereof was loaded as a work piece in a jig having an electricity supply function, and then the jig was placed in a glove box, the interior of which was adjusted to an argon atmosphere and low water content (a dew point of −30° C. or lower), and was immersed in a molten salt aluminum plating bath (33 mol % EMIC-67 mol % $AlCl_3$) at a temperature of 40° C. The jig holding the work piece was connected to the cathode of a rectifier, and an aluminum plate (purity 99.99%) of the counter electrode was connected to the anode. The work piece was plated by applying a direct current at a current density of 3.6 $A/dm^2$ for 90 minutes to obtain an aluminum structure in which 150 $g/m^2$ of an aluminum-plated layer was formed on the surface of the urethane foam. Stirring was performed with a stirrer using a rotor made of Teflon (registered trademark). Here, the current density is calculated based on the apparent area of the urethane foam.

Subsequently, only a part (50% of the total width length) of the aluminum structure corresponding to the shaded part in FIG. 5 (a) was immersed in a plating bath to perform additional plating. The weight per unit area at the end part was 250 $g/m^2$ (1.5 times the weight per unit area at the central part).

(Decomposition of Resin Molded Body)

The above-mentioned aluminum structure was immersed in a LiCl—KCl eutectic molten salt at a temperature of 500° C., and a negative potential of −1 V was applied to the aluminum structure for 30 minutes. Air bubbles resulting from the decomposition reaction of the polyurethane were generated in the molten salt. Then, the aluminum structure was cooled to room temperature in the atmosphere and was washed with water to remove the molten salt, to thereby obtain an aluminum porous body from which the resin had been removed. The obtained aluminum porous body had continuous pores and a high porosity as with the urethane foam used as a core material.

(Processing of End Part of Aluminum Porous Body)

The thickness of the obtained aluminum porous body was adjusted to 0.96 mm by a roller press, and the aluminum porous body was cut into a piece of 5 cm square.

As preparation for welding, a SUS block (rod) having a width of 5 mm and a hammer were used as a compressing jig, and the SUS block was placed at a location 5 mm from one end of the aluminum porous body and the porous body was compressed by beating the SUS block with the hammer to form a compressed part having a thickness of 100 μm.

Thereafter, a tab lead was welded by spot welding under the following conditions.

<Welding Condition>

| Welding Apparatus: | Hi-Max 100 manufactured by Panasonic Corporation, model No. YG-101 UD (Voltage can be applied up to 250 V) |
|---|---|
| Capacity: | 100 Ws, 0.6 kVA |
| Electrode: | Copper electrode with 2 mm in diameter |
| Load: | 8 kgf |
| Voltage: | 140 V |

<Tab Lead>

| Material: | Aluminum |
|---|---|
| Dimension: | Width 5 mm, Length 7 cm, Thickness 100 μM |
| Surface Condition: | Boehmite treatment |

LiCoO$_2$, acetylene black and PVDF were mixed in proportions of 88:6:6 with lithium cobalt oxide as an active material, and the resulting mixture was formed into a slurry with an NMP solvent. The aluminum porous body was filled with the slurry, dried, and then pressed to prepare an electrode. The electrode had a thickness of 0.7 mm and a capacity density of 10 mAh/cm$^2$ in terms of filling capacity.

A lithium secondary battery using a glass fiber filter as a separator was prepared by welding a tab for external extraction to a welding part for an aluminum ribbon and using as a counter electrode a lithium metal to which a tab for external extraction was attached in the same manner. A 1 mol/L solution of LiPF$_6$ in EC/DEC (1:1) was used as an electrolytic solution.

As a cycle test, charge-discharge at 0.5 C was repeated in a voltage range of 3 V to 4.2 V, and the discharge capacity in the first cycle was compared with the capacity after 100 cycles in terms of the weight unit of the active material. Further, the battery after 100 cycles was disassembled to observe the condition of the electrode.

Comparative Example 1

An aluminum porous body having a tab lead welded thereto was obtained in the same manner as in Example 1 except that the additional plating in Example 1 was not performed.

LiCoO$_2$, acetylene black and PVDF were mixed in proportions of 88:6:6 with lithium cobalt oxide as an active material, and the resulting mixture was formed into a slurry with an NMP solvent. The aluminum porous body was filled with the slurry, dried, and then pressed to prepare an electrode. The electrode had a thickness of 0.7 mm and a capacity density of 10 mAh/cm$^2$ in terms of filling capacity.

A lithium secondary battery using a glass fiber filter as a separator was prepared by welding a tab for external extraction to a welding part for an aluminum ribbon and using as a counter electrode a lithium metal to which a tab for external extraction was attached in the same manner. A 1 mol/L solution of LiPF$_6$ in EC/DEC (1:1) was used as an electrolytic solution.

As a cycle test, charge-discharge at 0.5 C was repeated in a voltage range of 3 V to 4.2 V, and the discharge capacity in the first cycle was compared with the capacity after 100 cycles in terms of the weight unit of the active material. Further, the battery after 100 cycles was disassembled to observe the condition of the electrode.

From the table below, in Example 1, the current density is uniform and degradation as a battery is suppressed in view of the state of the change in the lithium counter electrode. It is considered that the work piece central part where the weight per unit area is small is set as a lead-welded part of an electrode, so that when the electrode is formed, the electric resistance at a location remote from the lead-welded part, where a current is hard to pass, decreases and resultantly the current density distribution is improved.

TABLE 1

| | First cycle | After 100 cycles | Observation of electrode |
|---|---|---|---|
| Example 1 | 122 mAh/g | 118 mAh/g | No change in positive electrode Lithium counter electrode is slightly micro-powdered |
| Comparative Example 1 | 123 mAh/g | 79 mAh/g | No change in positive electrode Lithium counter electrode is micro-powdered, and particularly severely changed at a location close to the lead-welded part. |

The present invention has been described based on embodiments, but the invention is not limited to the above-mentioned embodiments. Variations to these embodiments may be made within the scope of identity and equivalence of the present invention.

INDUSTRIAL APPLICABILITY

An electrode using an aluminum porous body for a current collector of the present invention can be suitably used as an electrode for a secondary battery and the like because the electrode has no current distribution in the electrode plane, and therefore cycle characteristics are improved.

REFERENCE SIGNS LIST

1: Resin molded body
2: Conductive layer
3: Aluminum-plated layer 21a, 21b: Plating bath
22: Strip-shaped resin
23, 28: Plating bath
24: Cylindrical electrode
25, 27: Anode
26: Electrode roller
32: Compressing jig
33: Compressed part
34: Aluminum porous body
34-1: Central region
34-2: End region
34-3: End region
35: Rotating roller
36: Rotation axis of roller
37: Tab lead
38: Insulating/sealing tape
60: Lithium battery
61: Positive electrode
62: Negative electrode
63: Solid electrolyte layer (SE layer)
64: Positive electrode layer (positive electrode body)
65: Current collector of positive electrode
66: Negative electrode layer
67: Current collector of negative electrode
121: Positive electrode
122: Negative electrode
123: Separator
124: Presser plate
125: Spring
126: Pressing member
127: Case
128: Positive electrode terminal
129: Negative electrode terminal
130: Lead wire
141: Polarizable electrode
142: Separator
143: Organic electrolytic solution
144: Lead wire
145: Case
146: Positive electrode
147: Negative electrode
148: Lead wire
149: Lead wire

The invention claimed is:

1. A precursor body for a three-dimensional network aluminum porous body for a current collector, wherein when the precursor body has a central region and two end regions with the central region situated therebetween in a width direction, weights per unit area of aluminum in the aluminum porous body at the two end regions are larger than a weight per unit area of aluminum in the aluminum porous body at the central region.

2. A three-dimensional network aluminum porous body for a current collector, comprising:
a sheet-shaped three-dimensional network aluminum porous body being obtained by cutting in half a precursor body for a three-dimensional network aluminum porous body for a current collector at a central part in a width direction, wherein a weight per unit area of aluminum at one end part is larger than a weight per unit area of aluminum at the other end part in the width direction, the precursor body being a sheet-shaped three-dimensional aluminum porous body having a central region and two end regions with the central region situated therebetween in the width direction, weights per unit area of aluminum in the aluminum porous body at the two end regions are larger than a weight per unit area of aluminum in the aluminum porous body at the central region.

3. A current collector, wherein a tab lead is welded to be bonded to the end part where the weight per unit area of aluminum is smaller in the three-dimensional network aluminum porous body for a current collector according to claim 2.

4. The current collector according to claim 3, which is formed by bonding a tab lead to a compressed part, the compressed part being formed by compressing in the thickness direction the end part where the weight per unit area of aluminum is smaller.

5. An electrode, which is formed by filling a porous part of the current collector according to claim 4 with an active material.

6. A nonaqueous electrolyte battery, wherein the electrode according to claim 5 is used.

7. An electrode, which is formed by filling a porous part of the current collector according to claim 3 with an active material.

8. A nonaqueous electrolyte battery, wherein the electrode according to claim 7 is used.

* * * * *